FREQUENCY TRIPLER CIRCUIT UTILIZING THE THIRD HARMONIC COMPONENT OF TRANSFORMERS

Filed Aug. 13, 1962 3 Sheets-Sheet 1

INVENTORS
THEODORE R. KENNEDY
HENRY M. ROWAN, JR.
BY
Arthur H. Seidel
ATTORNEY

INVENTORS
THEODORE R. KENNEDY
HENRY M. ROWAN, JR.
BY Arthur H. Seidel
ATTORNEY

Dec. 27, 1966 H. M. ROWAN, JR., ETAL 3,295,050

FREQUENCY TRIPLER CIRCUIT UTILIZING THE THIRD HARMONIC COMPONENT OF TRANSFORMERS

Filed Aug. 13, 1962 3 Sheets-Sheet 3

INVENTORS
THEODORE R. KENNEDY
HENRY M. ROWAN, JR.
BY
Arthur H. Seidel
ATTORNEY

United States Patent Office 3,295,050
Patented Dec. 27, 1966

3,295,050

FREQUENCY TRIPLER CIRCUIT UTILIZING THE THIRD HARMONIC COMPONENT OF TRANSFORMERS

Henry M. Rowan, Jr., Moorestown, and Theodore R. Kennedy, Burlington, N.J., assignors to Inductotherm Corporation, Rancocas, N.J., a corporation of New Jersey Filed Aug. 13, 1962, Ser. No. 216,503
10 Claims. (Cl. 321—68)

In general, this invention relates to a new and improved frequency tripler circuit and, more particularly, to a frequency tripler circuit utilizing the third harmonic component of transformers in a three phase alternating current system to produce electrical current whose frequency is three times the supply frequency.

Commercial line frequencies of 50 or 60 cycles are presently available for and extensively used in induction heating, fluorescent lighting, and other applications. However, for these applications, there is an increasing need for higher frequency sources. In these high frequency applications, the user of the equipment does not want to go to the expense of installing rotary generating equipment, but would be far more satisfied with a convenient static device capable of converting three phase line frequency to a frequency three times the line frequency.

A frequency tripler has been developed in the past which utilizes the third harmonic component in the magnetizing current applied to an iron core reactor. One such tripler is shown in our co-pending application Serial No. 116,574 filed June 12, 1961, and entitled "Multiplier Circuit for Induction Furnace." In this type of tripler circuit, a Y-delta transformer system is connected to a three phase alternating current source of voltage sufficiently high to operate the transformer cores in the extremely high flux density or saturated range. The transformer secondary is an open delta, which connection causes the cancellation of the fundamental fifth, seventh, eleventh, etc. frequencies while leaving the third harmonic and multiples thereof available at the open terminals. The primary or Y connection has its neutral or common point ungrounded or unconnected to a supply system neutral. Thus, the third harmonic component of the exciting current is available for use in the secondary. Normally, if the neutral were connected to ground, the third harmonic would flow therethrough.

The desired construction for a tripler transformer calls for a high proportion of third harmonic energy with minimum losses. It is also desirable to minimize construction costs, size, stray magnetic fields, and supply line disturbances. In our above-mentioned patent application, it was shown that a properly designed magnetic core of toroidal shape, wound as a continuous tight spiral of magnetic tape or strip, gives most of the features required. This type of core has a reluctance which is essentially only that of the iron, and in which the flux paths are kept in a direction of the grain. That is, there are no splices or butts which occur in normal transformer core construction when the core is assembled from a number of pieces of magnetic laminations. The splices or butts interpose magnetic discontinuities such that there is a great deal of magnetic leakage in the air surrounding the core. In a toroidal core of the type mentioned above, magnetic leakage is at a minimum as all of the flux tends to flow through the iron core. The leakage in a normal transformer core approaches a limiting value of saturation and impedance and the non-linear qualities of the core are not available for producing the required third harmonic. Additionally, magnetic leakage increases stray eddy current heating and increases the capacitance required for power factor correction and requires additional design and test considerations.

Since the third harmonic is produced by the inherent magnetic qualities of the core and the percentage of third harmonic with respect to the fundamental frequency increases with an increase in flux density while the percentage of fundamental decreases, it is desirable to operate the core in the saturation range. The toroidal core, when operated in the saturation range, is a highly unstable device for cross-the-line operation. That is, if the applied voltage varies to any degree, the magnetizing current will vary in accordance with the tenth power or higher of the change in applied voltage. Thus, the toroidal core can be said to act as a negative resistance.

In the above-mentioned patent application, this unstable nature of the toroidal core transformer was corrected by utilizing a series reactor of easily defined value and construction. These series reactors were normally air core reactors and were necessarily large and expensive.

It is the general object of this invention to avoid and overcome the foregoing and other difficulties of the prior art practices by the provision of a new and better frequency tripler.

Another object is to provide a new and better frequency tripler in which the third harmonic of the primary exciting current of a three phase transformer system is utilized to feed a load circuit.

A further object is to provide a system such as is mentioned above which utilizes toroidal cores for the transformers with low permeability spacers between the windings and the cores to stabilize the exciting current with respect to changes in voltage.

Another object of this invention is to provide a system such as is discussed above in which the spacers aid in forming the winding around the cores while providing a higher volume permeance than air.

Another object of this invention is to provide a new and improved three phase frequency tripler in which reflected harmonics in the primary circuit are substantially reduced.

Another object of this invention is to provide a new and better three phase transformer frequency tripler circuit in which supply line power factor is improved while cost of the entire system is reduced.

Other objects will appear hereinafter.

For the purpose of illustrating the invention there is shown in the drawings forms which are presently preferred; it being understood, however, that this invention is not limited to the precise arrangements and instrumentalities shown.

When an alternating voltage is impressed on a series circuit containing an iron core reactor or transformer, the flux produced by the magnetomotive force of the exciting current does not vary proportionately with the impressed voltage. Since the flux varies in accordance with the magnetization curve, the result is a distorted exciting current as this current produces flux to reach the applied voltage.

By distortion, it is meant that the curve of exciting current does not follow the input or applied voltage curve. Assuming a sine wave input to the core, the particular resultant exciting current for a series wound core could be represented by the curve $i_e$ shown in FIGURE 1. As can be seen, the sequence of values of the function of the curve of $i_e$ throughout any half cycle is the negative of the values encountered throughout the preceding or succeeding half cycle; that is, the wave forms of positive and negative half cycles are identical except for sign. It can be proved by Fourier analysis that this kind of curve contains only odd harmonic components. By odd harmonic components it is meant that the curve contains a fundamental frequency which is the frequency of the curve plus odd integral multiples of the fundamental frequencies such as the third harmonic, fifth, seventh, etc.

Figure 1:
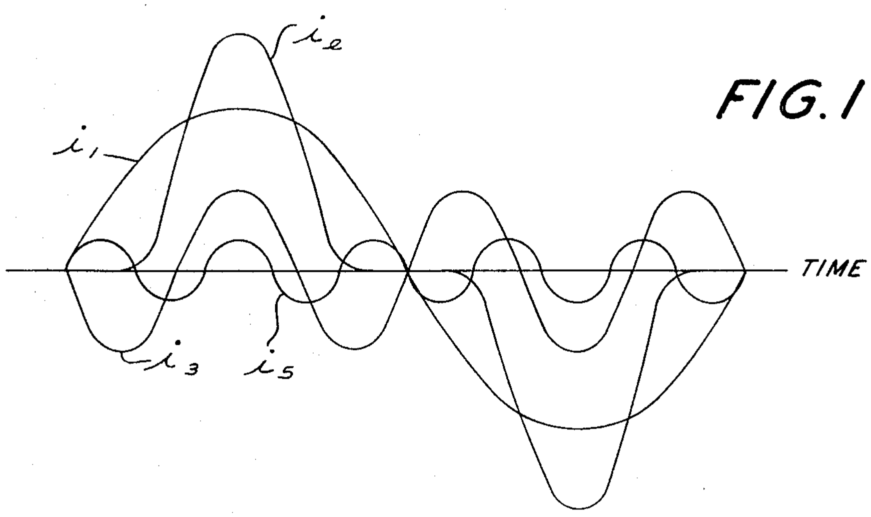
FIGURE 1 is a graphical showing of the exciting current of a single phase transformer with its harmonic components broken down into individual curves.

In FIGURE 1, there are shown the first harmonic $i_1$, third harmonic $i_3$, and fifth harmonic $i_5$ curves for the particular exciting current curve $i_e$ shown. As the flux density of the particular core utilized increases, the positive and negative peaks of the exciting current curves become greater and sharper, with the result that the fundamental component thereof decreases and the third harmonic component thereof increases.

Figure 2:
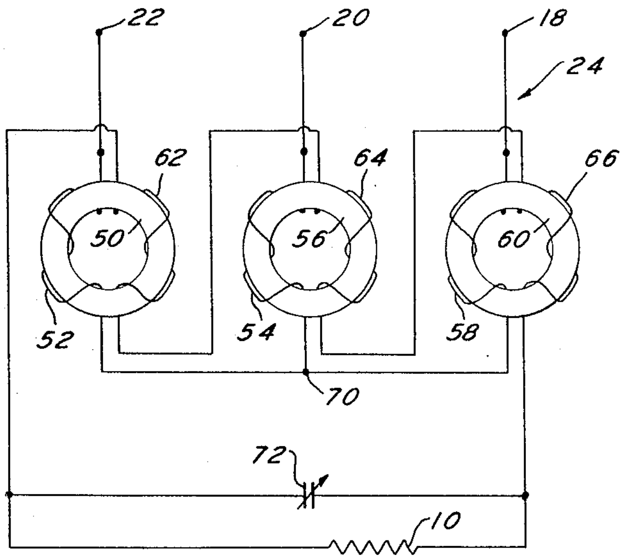
FIGURE 2 is a schematic showing of the frequency tripler of the precent invention.

Therefore, it can be seen that to have a better third harmonic generator such as is necessary in a frequency tripler circuit, it is desirable to operate the core of a reactor at extremely high flux densities. In FIGURE 2, there is shown a tripler circuit embodying the teachings of the present invention. Although the principles of the present invention are especially useful in this type of frequency multiplier, other types of magnetic multipliers such as those based on the summation of pulses obtained from saturable reactors used with phase changing transformers can be utilized by one skilled in the art.

In FIGURE 2, the tripler circuit has been generally designated by the numeral 24 and is adapted to feed a load 10. The load 10 has been shown as a resistance but might normally be one with a leading power factor. The load can be an induction furnace, fluorescent lamp, etc. and its power factor can be determined by series or parallel capacitors in combination with the particular load.

The tripler circuit 24 has three input terminals 18, 20 and 22 normally connected to a standard three phase 60 cycle supply.

Three toroidal core transformers 50, 56 and 60 have their primary windings 52, 54 and 58 respectively connected in Y relation to the input terminals 22, 20 and 18 respectively. The Y circuit has its neutral 70 unconnected to ground or to the supply neutral. In such a connection, the third harmonic components of the primary currents cannot exist as they are cancelled at the neutral point 70 and their return path in the neutral wire is open circuited. However, the third harmonic component in the primaries does induce a third harmonic counter electromotive force in each of the individual cores 50, 56 and 60. Although the sum of these counter electromotive forces across the three wires to neutral is zero, they can and do have an effect on the individual secondaries wound on the toroidal cores 50, 56 and 60.

Cores 50, 56 and 60 have secondary windings 62, 64 and 66 wound as an open delta or series arrangement across the load 10. The windings 62, 64 and 66 have their counter electromotive forces in additive arrangement so that the third harmonic voltage produced by the primary exciting current in each of the secondary windings 62, 64 and 66 is added. Thus, the total voltage across the load 10 contains a third harmonic component equaling three times the third harmonic electromotive force induced in each secondary winding. Since the fundamental fifth, seventh, etc. harmonic voltages in the three secondaries 62, 64 and 66 are equal in magnitude and displaced in phase by 120 degrees, their sums are zero and, therefore, there are no voltages of these frequencies across the open corner of the secondary delta. Since the third harmonic components have a complete cycle every 120 degrees, they add rather than cancel. Hence, if harmonics of higher order than the seventh are neglected (as they should be), the voltage across the open corner of the secondary delta equals three times the third harmonic electromotive force generated in each secondary when the transformers are identical and the applied voltages are balanced.

A capacitor 72 is placed in parallel with the load 10 so as to provide a leading power factor and thereby increase the actual voltage applied to the load. The tripler cores utilized in the present invention have been shown to operate by distorting an input sine wave to create a third harmonic component in the magnetizing current through the toroidal cores. As was stated previously, with high magnetic flux density in the core, the third harmonic component in the magnetizing current is increased. In fact, it may well reach values over fifty percent of the value of the fundamental frequency.

Figure 3:
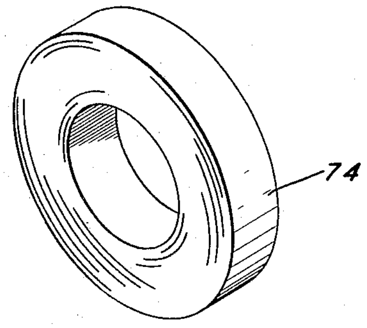
FIGURE 3 is a pictorial showing of a spirally wound toroidal core.

As was disclosed in the above-mentioned patent application, a properly designed magnetic core of toroidal shape wound as a continuous tight spiral of magnetic tape or strip is very useful in producing third harmonic energy with minimum losses. Such a core is shown in FIGURE 3 and designated by the numeral 74. The impedance of a coil which was tightly wound around the toroidal magnetic core 74 would be almost entirely determined by the inherent magnetic properties of the core. Magnetic leakage in the air surrounding the core 74 would be at a minimum and therefore in the range of saturation, small changes in the voltage impressed on the coil terminals would result in marked changes in the value of the exciting or magnetizing current. In fact, in certain ranges of magnetization, the value of the magnetizing current versus the applied voltage may vary at a rate equal to or greater than the tenth power of the applied voltage. Since the saturation range is the range in which the highest flux densities are achieved, it is desirable to operate in this range.

In normal transformer core constructions where the core is assembled from a number of magnetic laminations, the splices or butts necessary to form a closed magnetic loop interpose magnetic discontinuities such that there is a great deal of magnetic leakage. With sufficient leakage, the magnetic circuit approaches a limiting value of saturation and impedance and the non-linear qualities of the core are no longer available for producing the required third harmonic component. The advantage of magnetic leakage, however, is the degree of electrical stabilization it gives to the transformer. However, the magnetic leakage increases stray eddy current heating and increases the capacitors required for power factor correction. Additionally, since the amount of magnetic leakage is not easily determined, the design problems inherent in such a construction raise serious design considerations.

On the other hand, the toroidal core of the present invention provides a closed loop flux path with little magnetic discontinuities if the grains of the spirally wound magnetic strips are oriented in the direction of the winding. With this type of core, as was stated previously, there is minimum leakage. In order to compensate for the unstable nature of the toroidal core transformer, in our pending application there was utilized a fixed value reactor in series with each toroidal core transformer.

The present invention contemplates the replacement of the external series reactor with a modified tripler core. The toroidal core will still be utilized to provide a complete magnetic path with little leakage. However, to compensate for the unstable nature of the core, the primary and secondary windings are less tightly wound on the core so that there is a significant amount of space between the core and windings. This space continuously wound around the core may have any shape or cross section. The winding then will enclose a ferromagnetic core of non-linear permeability (i.e. the toroidal core) and an air core of constant permeability and definite dimensions magnetically in shunt with the ferromagnetic core. The air core portion of the assembly will now have a finite value of inductance determined by the winding, the cross section, and the circumferential length. The air gap supporting or adjacent to the core acts as a separate series reactance of constant value being directly associated with the current flowing in the winding and acting on the core. Hence, it exerts a stabilizing influence on the performance of the tripler transformer and in the same manner as a separate reactance.

Because of the extremely distorted shape of the exciting current curve in the saturating range of the toroidal core, there are in addition to the fundamental and third harmonic frequencies substantial values of current of the fifth, seventh and higher order harmonics. These currents add nothing to the desired third harmonic and increase the loss in the tripler transformer and in the primary supply circuits. These undesirable harmonics reflect back into the supply lines and can be a source of difficulty. The constant permeability core (air core) will act as an harmonic filter to provide space for the magnetic flux from the higher harmonics to be absorbed without undue losses from stray fields or magnetic leakage. Since, in a toroidal winding, there is no field external to the fixed reactance value within the windings, there is no need in designing such transformer to take into consideration such external leakage which is normally difficult to determine.

It should be noted that the toroidal core itself will not be directly affected by the surrounding extra space. The magnetomotive force of the ampere turns of the winding act on the core in a rigorously certain manner unaffected by the space between the windings and the core. Aside from an increase in the length of the conductor wound around the toroidal core, there has been added the stabilizing effect of a series reactance by the simple device of spacing the winding from the core in a definite and desirable manner. So long as the permeability of the toroidal core remains higher than the permeabiltiy of air, the majority of the flux will flow in the toroidal core. However, as the permeability of the core lessens with increased saturation, the air core between the windings and the magnetic core will act to stabilize the transformer by providing the equivalent of a series impedance.

Figure 4:
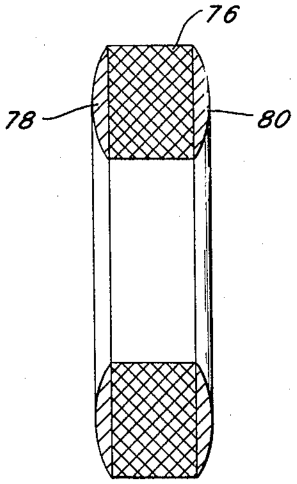
FIGURE 4 is a cross sectional view of a spirally wound toroidal core with low permeability rings thereon utilized in the present invention.

A refinement of the use of an air core between the winding and the magnetic core has been shown in FIGURE 4. In this refinement, the air core is replaced by a magnetic material of low but relatively fixed permeability to replace all or a portion of the extra air space between the windings and the core. By this means, the volume of the air space can be greatly reduced for a given value of equivalent series reactance with improvements in efficiency and relative dimensions.

In FIGURE 4, there is shown a toroidal core 76 having cemented to its ends spacing rings concentric with the core. These spacing rings are manufactured from a quantity of magnetic iron powder of the type used for making magnetic cores mixed with a suitable binder such as an epoxy or chemical setting resin and formed into a ring of suitable cross section. A mixture of approximately nine parts of magnetic particles to one part of resin would be effective for the purposes to be described hereinafter. The rings 78 and 80 are proportioned so as to fit concentrically with the core 76. Although they are shown on the ends of the core, it can easily be seen that the rings might be placed on the inside diameter or the outside diameter of the spirally wound core 76. The cemented iron powder rings 78 and 80 are shaped so as to assist in forming the conductors around the core during the winding process. That is, they provide a smooth surface for winding. One or more of such rings may be common to one or any of a succession of windings and may be positioned between windings rather than between windings and core.

The cemented iron powder ring shown is utilized because the volume of the cementing agent (a non-magnetic substance) is such that the final formed shape is a composite of highly magnetic particles separated by a multiplicity of non-magnetic gaps. The volume magnetic permeance (permeance per unit volume) is low because of the numerous statistically equal gaps. The volume permeance being greater than air, the space required for the fixed reactance value is diminished in the ratio of the volume permeance of the cemented powder rings. With a permeability 5 to 50 times greater than the permeability of air, the savings in space and over-all dimensions can easily be seen.

When the core 76 and rings 78 and 80 are placed within the windings, they are subjected in general to the same order of magnetizing ampere terms. The core is operated in the high flux density region or is said to be saturated. At the same time, due to the choice of a low permeability in the cemented rings, the great dispersion of gaps gives the rings a relatively high reluctance which makes the flux density in the rings less than the flux density in the core. If the flux density in the laminated core is not chosen too high and if the permeability of the cemented rings is relatively low, then the permeability of the cemented rings remains substantially constant giving the effect of a fixed series reactance. In other words, the permeability of the laminated core is designed to always remain greater than the permeability of the cemented iron ring.

The permeability of cemented iron powder cores is determined by sample and test procedures. The proportions of cemented agent and iron powder used are generally selected to provide a dependable bond consistent with permeabilities under 50 relative to air. A proportion which mixes and handles well and has a moderate permeability which can be duplicated is the one stated above of nine parts iron powder to one part epoxic resin.

Figure 5:
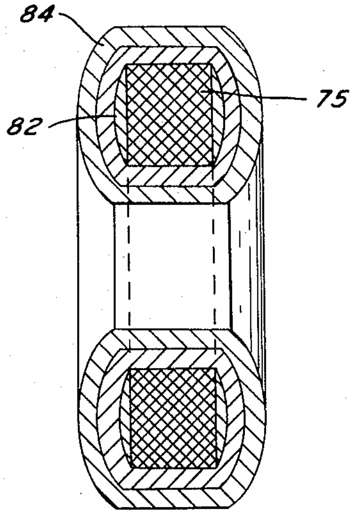
FIGURE 5 is a cross sectional view of the core of FIGURE 4 with primary and secondary windings placed therearound.
Figure 6:
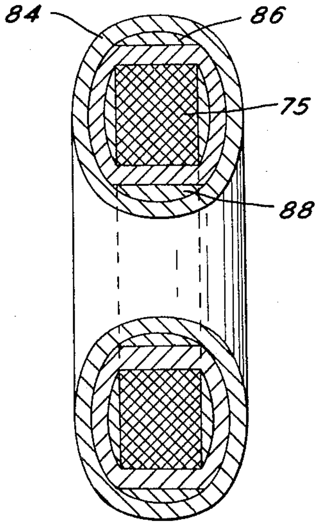
FIGURE 6 is a cross secional view of a second embodiment of the present invention in which spacer rings are placed between primary and secondary windings.

In FIGURE 5, there is shown a cross sectional area of a core in which the primary winding 82 is wound directly around the core 75 with the secondary winding 84 wound around the primary 82. If it is desired to have one circuit exhibit more stability than another or to create a degree of decoupling between the primary and secondary circuits, the embodiment shown in FIGURE 6 would be utilized. In FIGURE 6, additional spacers 86 and 88 are utilized between the primary winding 84 and 82.

The low permeability core spacers 86 and 88 may be manufactured of a number of bundles of laminations with short equally spaced gaps shaped into a ring or continuous magnetic circuit instead of a cemented iron powder ring.

The spacer low permeability rings 86 and 88 are also shaped to conform to the natural winding of the conductors so as to provide a uniform low permeability core.

Figure 7:
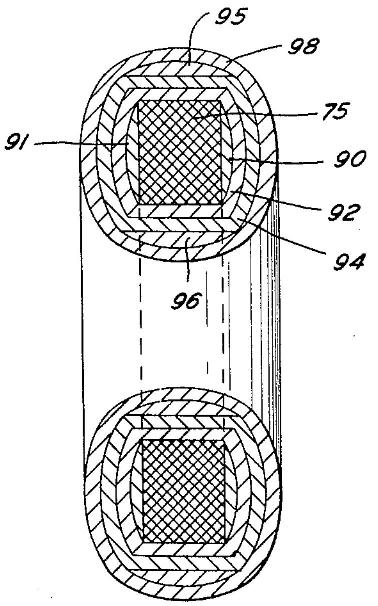
FIGURE 7 is a cross sectional view of a third embodiment of the present invention in which a capacitor winding is utilized on the transformer structure.

In FIGURE 7, there is shown a cross sectional view of a third embodiment of the present invention. In this embodiment, a spirally wound toroidal 75 has spacers 90 and 91 separating a secondary winding 92 from the core 75. A capacitor winding 94 is wound around the secondary winding 92 for reasons which will become obvious with reference to FIGURE 8. A second pair of spacers 95 and 96 separates the capacitor winding 94 from the primary winding 98. The spacers 95 and 96 act to partially decouple the primary winding 98 from the secondary winding 92. The spacers 95 and 96 also aid in absorbing higher harmonics of the exciting current so as to prevent their return to the supply.

Figure 8:
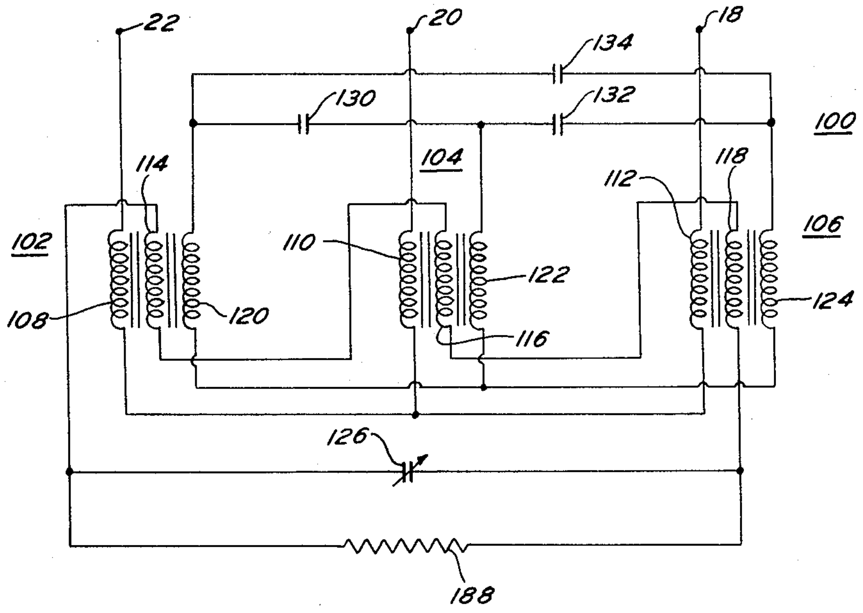
FIGURE 8 is a schematic showing of a frequency tripler circuit utilizing the transformer structure shown in FIGURE 7.

In FIGURE 8, there is shown a frequency tripler circuit 100 utilizing magnetic cores such as are shown in FIGURE 7. A three phase 60 cycle alternating current source supplies the frequency tripler circuit 100 from the terminals 18, 20 and 22. Three transformers 102, 104 and 106, similar to the transformer shown in FIGURE 7, are connected in a Y-primary open delta secondary type arrangement. The transformers 102, 104 and 106 have primary windings 108, 110 and 112 respectively connected in a Y arrangement. The secondary windings 114, 116 and 118 of the transformers 102, 104 and 106 respectively are connected in an open delta arrangement with a parallel capacitor 126 and resistor 128 load similar in all respects to the circuit shown in FIGURE 2.

Capacitor windings 120, 122 and 124 of the transformers 102, 104 and 106 are connected in Y circuit relation. These last-mentioned capacitor windings are connected to three capacitors 130, 132 and 134 connected in delta arrangement. The purpose of the capacitors 130, 132 and 134 is to improve the power factor of the frequency tripler circuit and to compensate for current distortions in the primary windings. It should be noted that the transformation ratio between the primary windings 108, 110 and 112 and the capacitor windings 120, 122 and 124 will determine the voltages applied to the capacitors 130, 132 and 134. Thus, a person designing a frequency tripler circuit would not be limited to any particular voltage rating for the capacitors he wished to utilize, but could vary the transformation ratio in accordance with the capacitors he had available.

Additionally, it can be seen that the embodiment shown in FIGURE 8 has eliminated the need for line chokes to prevent distortions in the primary circuit from being fed back to the supply by the provision of the delta capacitive network.

The present invention may be embodied in other specific forms without departing from the spirit or essential attributes thereof and, accordingly, reference should be made to the appended claims, rather than to the foregoing specification as indicating the scope of the invention.

We claim:

1. An inductive unit comprising an annular ferromagnetic core forming a continuous path for flux flowing through the ferromagnetic core, a winding adapted to be connected to a source of alternating current wound around said ferromagnetic core, and spacing means for providing an annular space between said winding and said core having a lower permeability than said ferromagnetic core when said core is saturated by an alternating current flowing through said winding, said spacing means being a cemented iron powder ring concentric with said toroidal core.

2. An inductive unit comprising an annular ferromagnetic core forming a continuous path for flux flowing through the ferromagnetic core, a winding adapted to be connected to a source of alternating current wound around said ferromagnetic core, and spacing means for providing an annular space between said winding and said core having a lower permeability than said ferromagnetic core when said core is saturated by an alternating current flowing through said winding, a second winding in mutual inductive relation with said first winding wound on said core, and second spacing means adapted to be placed between said first and second windings, said second spacing means having a lower permeability than said ferromagnetic core when said core is operated in its saturation region.

3. A frequency tripler circuit comprising three single phase transformers having three primary and three secondary windings, one of each of said primary and secondary windings being wound on three ferromagnetic cores each forming a continuous path for flux flowing through the ferromagnetic core, connecting means for connecting said primary windings to a three phase alternating current supply and said three secondary windings to a load, and spacing means for providing annular spacers between at least one of said windings and its associated core, said annular spacers being formed of material having a permeability greater than air but less than the permeability of said ferromagnetic core when said core is operated in its saturation region.

4. The frequency tripler circuit of claim 3 wherein said ferromagnetic core is formed of a spirally wound magnetic strip in the form of a toroid.

5. The frequency tripler circuit of claim 3 wherein said annular spacers are shaped to fit the natural curvature of said windings when they are wound about said cores.

6. The frequency tripler circuit of claim 5 wherein said annular spacers are formed of powdered iron particles in a non-magnetic base formed in the shape of a ring whose axis is concentric with the axis of said toroidal core.

7. The frequency tripler circuit of claim 3 including a second spacing means adapted to be placed between said primary and secondary windings, said second spacing means having a permeability greater than air but less than the permeability of said ferromagnetic core when said core is operated in its high flux density region.

8. The frequency tripler circuit of claim 3 wherein said three primary windings are connected in a Y circuit relation and said three secondary windings are connected in an open delta circuit.

9. The inductive unit of claim 2 including a third winding in mutual inductive relation with said first and second windings, said third winding being connected to a capacitor to vary the power factor of the inductive unit.

10. The frequency tripler circuit of claim 7 including three capacitor windings wound on each of said ferromagnetic cores and a balanced capacitor network connected to said capacitor windings to improve the power factor of said frequency tripler circuit.

References Cited by the Examiner

UNITED STATES PATENTS

| | | | |
|---|---|---|---|
| 1,124,034 | 6/1915 | Gerding | 336—233 |
| 2,118,291 | 5/1938 | Bollman | 336—233 |
| 2,883,604 | 4/1959 | Mortimer | 321—68 |
| 2,947,959 | 8/1960 | Polzella et al. | 336—229 |
| 3,040,231 | 6/1962 | Biringer | 321—69 |

FOREIGN PATENTS

| | | |
|---|---|---|
| 659,794 | 5/1938 | Germany. |
| 1,098,604 | 2/1961 | Germany. |
| 460,449 | 1/1937 | Great Britain. |

JOHN F. COUCH, *Primary Examiner.*

LLOYD McCOLLUM, *Examiner.*

G. J. BUDOCK, G. GOLDBERG, *Assistant Examiners.*